(12) United States Patent
Wada et al.

(10) Patent No.: US 9,027,970 B2
(45) Date of Patent: May 12, 2015

(54) CONNECTION APPARATUS FOR FLUID PRESSURE DEVICES

(75) Inventors: Makoto Wada, Tsukuba (JP); Koji Katsuta, Kawaguchi (JP)

(73) Assignee: SMC Kabushiki Kaisha, Tokyo (JP)

( * ) Notice: Subject to any disclaimer, the term of this patent is extended or adjusted under 35 U.S.C. 154(b) by 40 days.

(21) Appl. No.: 14/116,353

(22) PCT Filed: Jul. 21, 2011

(86) PCT No.: PCT/JP2011/067173
§ 371 (c)(1),
(2), (4) Date: Nov. 8, 2013

(87) PCT Pub. No.: WO2012/153429
PCT Pub. Date: Nov. 15, 2012

(65) Prior Publication Data
US 2014/0084585 A1   Mar. 27, 2014

(30) Foreign Application Priority Data

May 9, 2011   (JP) .................................. 2011-104620

(51) Int. Cl.
F16L 23/04   (2006.01)
F15B 21/04   (2006.01)
F16L 17/06   (2006.01)

(52) U.S. Cl.
CPC ............... *F15B 21/048* (2013.01); *F16L 23/04* (2013.01); *F16L 17/06* (2013.01)

(58) Field of Classification Search
CPC ........... F16L 17/06; F16L 41/08; F16L 23/04; F15B 21/048

USPC ............................ 285/124.5, 325, 124.4, 406; 137/614.01; 184/55.1, 55.2
See application file for complete search history.

(56) References Cited

U.S. PATENT DOCUMENTS 180,781 A * 8/1876 Morgan ........................ 285/406
4,533,020 A   8/1985 Yamazaki
(Continued)

FOREIGN PATENT DOCUMENTS

CN   2937608       8/2007
EP   0 261 711 A2  3/1988
(Continued)

OTHER PUBLICATIONS

International Search Report Issued Mar. 12, 2012 in PCT/JP11/67173 Filed Jul. 21, 2011.

(Continued)

*Primary Examiner* — David E Bochna
(74) *Attorney, Agent, or Firm* — Oblon, McClelland, Maier & Neustadt, L.L.P.

(57) ABSTRACT

In relation to fluid pressure devices, a connection apparatus, by which a filter, a regulator and a lubricator that constitute a fluid pressure unit are mutually connected, is equipped with a base member having a hole therein, a pair of first and second fastening members mounted respectively on one side surface and another side surface of the base member, and first and second holders in which the first and second fastening members are retained. Additionally, the first and second holders engage respectively with engagement projections of the filter, the regulator and the lubricator, and first and second nuts are screw-engaged with the first and second fastening members, whereby the fluid pressure devices are connected together through the first and second holders.

7 Claims, 7 Drawing Sheets

(56) References Cited

U.S. PATENT DOCUMENTS

| | | | |
|---|---|---|---|
| 5,025,834 A | 6/1991 | Stoll | |
| 5,372,392 A * | 12/1994 | Dunn et al. | 285/364 |
| 5,383,689 A * | 1/1995 | Wolfe, Sr. | 285/124.3 |
| 5,951,066 A * | 9/1999 | Lane et al. | 285/406 |
| 6,039,358 A * | 3/2000 | Stoll et al. | 285/364 |
| 7,350,829 B2 * | 4/2008 | Dyal et al. | 285/406 |
| 8,061,385 B2 * | 11/2011 | Kaitsuka | 137/614.01 |
| 2003/0006097 A1 * | 1/2003 | Tomita et al. | 184/55.1 |
| 2010/0225105 A1 | 9/2010 | Gebauer et al. | |

FOREIGN PATENT DOCUMENTS

| | | |
|---|---|---|
| JP | 56 171208 | 12/1981 |
| JP | 59 6695 | 1/1984 |
| JP | 63 146216 | 9/1988 |
| JP | 6 71913 | 10/1994 |
| JP | 2003-21118 | 1/2003 |
| JP | 3851119 | 11/2006 |

OTHER PUBLICATIONS

Written Opinion of the International Searching Authority Issued Mar. 12, 2012 in PCT/JP11/67173 Filed Jul. 21, 2011.

Notice of Allowance issued May 7, 2014 in Japanese Patent Application No. 2011-104620 (with English translation of pertinent portion).

* cited by examiner

CONNECTION APPARATUS FOR FLUID PRESSURE DEVICES

TECHNICAL FIELD

The present invention relates to a connection apparatus for fluid pressure devices, by which fluid passages among a plurality of fluid pressure devices are interconnected, by connecting in parallel multiple fluid pressure devices of the same or different types, such as, for example, a filter, a regulator, a lubricator, etc.

BACKGROUND ART

As disclosed in Japanese Patent No. 3851119, the present applicant has proposed a connection apparatus by which fluid pressure devices, such as a filter, a regulator, a lubricator, etc., which are used in a pneumatic circuit, are connected together integrally. With this connection apparatus, a through hole is formed in a body having a hole therein, an engagement member is engaged by a bolt, which is inserted through the through hole, and engagement flanges of the engagement member are engaged respectively with projections, which are disposed in the vicinity of ports of two adjacent fluid pressure devices, and thereafter, by tightening the bolt, the fluid pressure devices are interconnected via the engagement flange.

SUMMARY OF INVENTION

A general object of the present invention is to provide a connection apparatus for fluid pressure devices, which can be simplified in structure and made smaller in scale.

The present invention is a connection apparatus for fluid pressure devices, which is arranged between one fluid pressure device and another fluid pressure device, by which respective fluid passages of the one fluid pressure device and the other fluid pressure device are mutually communicated, by connecting the fluid pressure devices together integrally, comprising:

a body having a hole therein by which the fluid passages of the one fluid pressure device and the other fluid pressure device mutually communicate;

a pair of holders, which are disposed on one side surface and another side surface of the body perpendicular to an axial direction of the hole, and having retaining members that engage with projections disposed respectively on the one fluid pressure device and the other fluid pressure device; and a pair of fastening members provided on the one side surface and the other side surface of the body and which are capable of fixing the holders, wherein the fastening members include respectively a main body portion that is retained in the body, and a shaft portion projecting with respect to the main body portion, the shaft portions of the fastening members being inserted through the holders, the holders and the fastening members are connected through the shaft portions, and the fastening members are formed with substantially the same width as the body.

In accordance with the present invention, the fastening members having shaft portions are disposed on one side surface and another side surface of the body, which is arranged between one fluid pressure device and another fluid pressure device, and the holders are inserted and connected with respect to the shaft portions, whereby the projections on one of the fluid pressure devices and the projections on the other of the fluid pressure devices are connected through the retaining members of the holders.

Accordingly, compared to a case in which a through hole is formed through which a bolt is inserted with respect to the body, by providing the shaft portions, the body and the fastening members can be formed with substantially the same thickness, whereby it is possible to suppress the thickness dimension of the body. As a result, the connection apparatus including the body can be made smaller in scale in the thickness direction, and together therewith, the distance between adjacent fluid pressure devices can be shortened, and the fluid pressure unit can be made smaller in scale overall. Further, since the fluid pressure devices can be connected together by fixing the pair of holders respectively onto the shaft portions, the structure can be simplified compared with the connection apparatus for fluid pressure devices according to the conventional technique, and the number of parts and assembly steps required therefor can be reduced.

The above and other objects, features and advantages of the present invention will become more apparent from the following description when taken in conjunction with the accompanying drawings in which a preferred embodiment of the present invention is shown by way of illustrative example.

DESCRIPTION OF EMBODIMENTS

Figure 1:
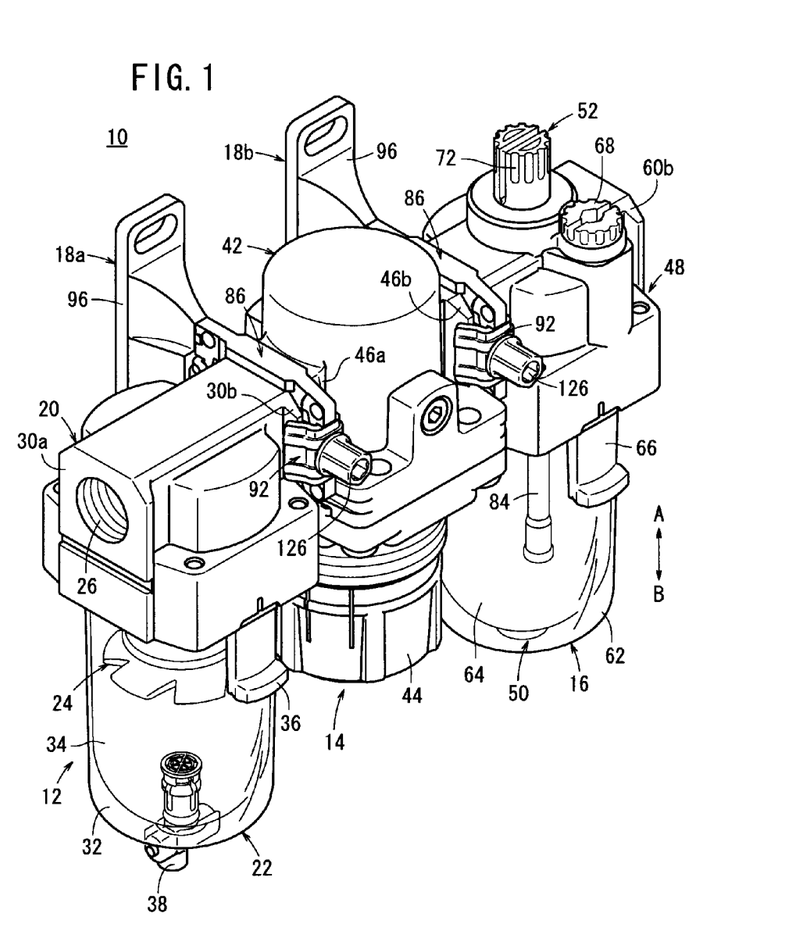
FIG. 1 is an exterior perspective view of a fluid pressure unit to which a connection apparatus for fluid pressure devices according to an embodiment of the present invention is applied.

In FIG. 1, reference numeral 10 indicates a fluid pressure unit to which the connection apparatus for fluid pressure devices according to an embodiment of the present invention is applied. Because connection apparatus 18a, 18b are constituted respectively from the same constituent elements, explanations shall be made below concerning only one of the connection apparatus 18a. Concerning the other connection apparatus 18b, the same reference characters designate the same constituent elements as those of the one connection apparatus 18a, and detailed descriptions of such elements are omitted.

Figure 2:
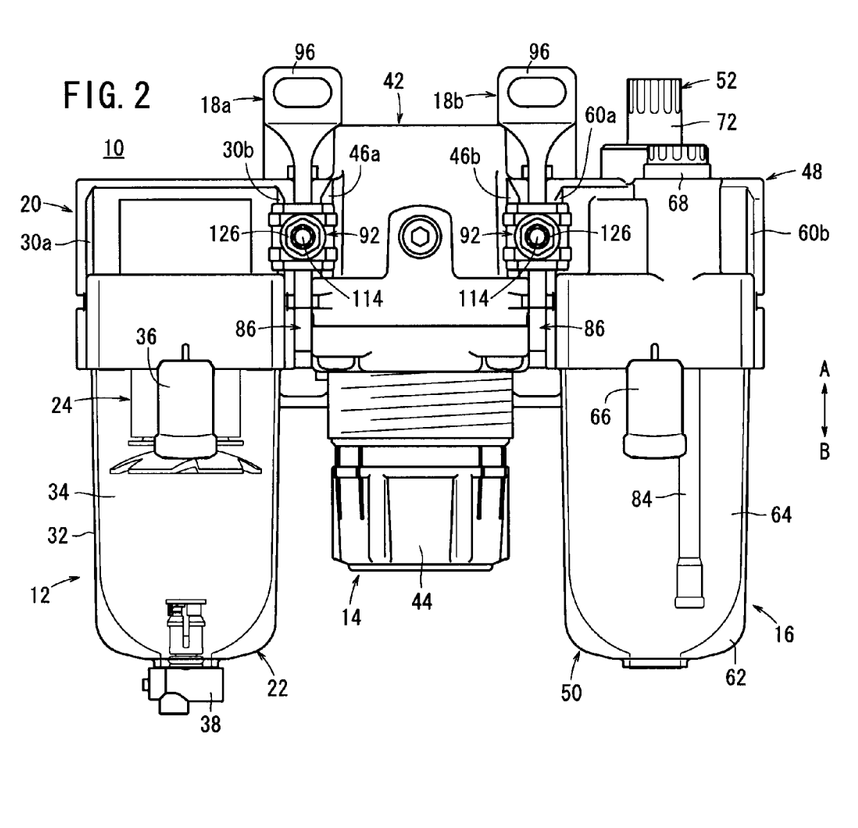
FIG. 2 is a front view of the fluid pressure unit shown in FIG. 1.

As shown in FIGS. 1 and 2, the fluid pressure unit 10 is constituted by a filter 12 for removing dust, debris and the like contained within the pressure fluid, a regulator 14 for reducing pressure of the pressure fluid, a lubricator 16 for mixing a lubricating oil with respect to the pressure fluid, and a pair of connection apparatus 18a, 18b by which the filter 12, the regulator 14 and the lubricator 16 are interconnected.

The aforementioned filter 12, regulator 14 and lubricator 16 function as fluid pressure devices, to which a pressure fluid is supplied to interior portions thereof. The regulator 14 is disposed between the filter 12 and the lubricator 16.

Figure 3:
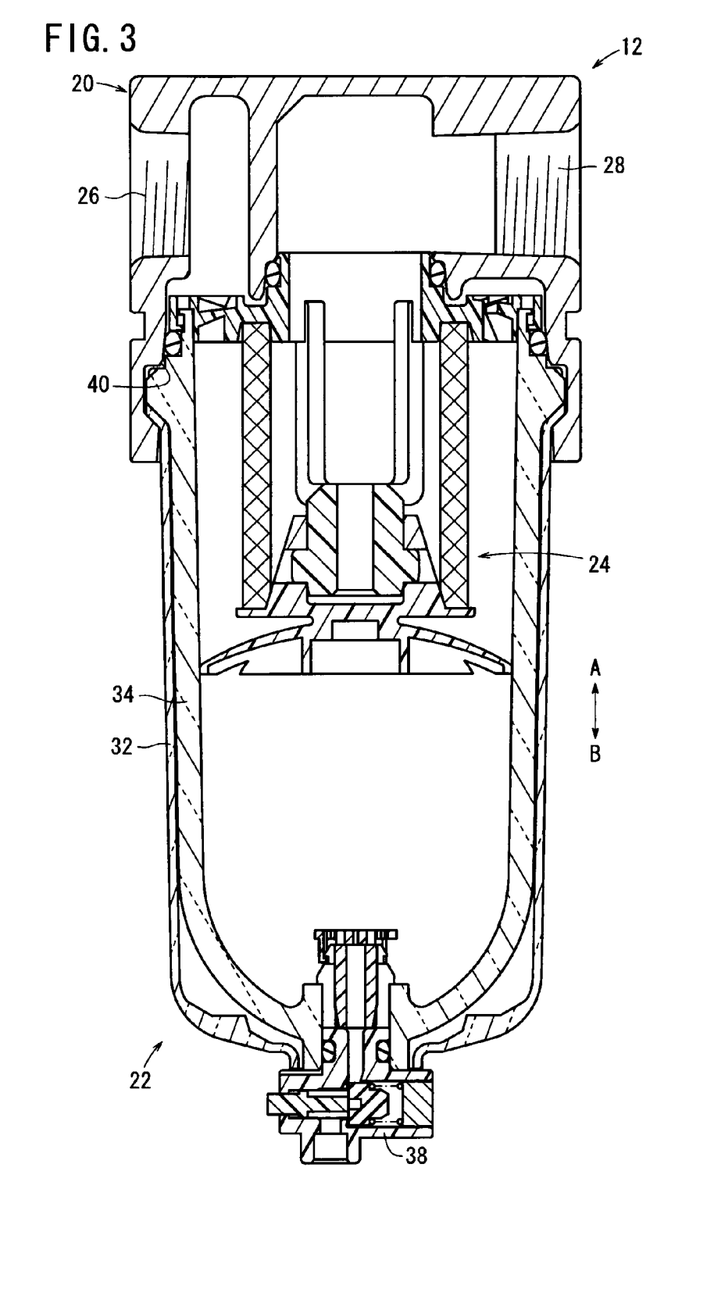
FIG. 3 is an overall cross sectional view of a filter, which constitutes part of the fluid pressure unit of FIG. 1.

As shown in FIGS. 1 through 3, the filter 12 includes a first body 20, a case unit 22 connected to a lower part of the first body 20, and a filter unit 24, which is accommodated in the interior of the case unit 22.

First and second ports 26, 28 for supply and discharge of a pressure fluid are disposed laterally, i.e., on respective sides, of the first body 20. The first port 26 is connected to an unillustrated tube through which the pressure fluid is supplied. The pressure fluid, which is supplied to the first port 26, is discharged through the second port 28 into a later-described regulator 14.

Further, a pair of engagement projections 30a and a pair of engagement projections 30b are disposed on side surfaces of the first body 20. The pairs of the engagement projections 30a, 30b are each mutually opposed to one another on outer edges of end surfaces on which the first and second ports 26, 28 are provided.

The case unit 22 includes an outer case 32 formed as a bottomed cylinder, an inner case 34 inserted through the interior of the outer case 32, a release button 36 that is displaceable with respect to the outer case 32, and a drain cock 38, which is disposed on a bottom portion of the outer case 32 and the inner case 34.

In addition, when the case unit 22 is installed with respect to an installation hole 40 of the first body 20, an upper end of the release button 36 is inserted into a recess (not shown), which is formed in the installation hole 40 of the first body 20. Owing thereto, rotational displacement of the case unit 22 with respect to the first body 20 is regulated.

As shown in FIGS. 1 and 2, the regulator 14 comprises a second body 42, a handle 44 that is rotatably disposed on a lower part of the second body 42, and a pressure adjustment mechanism (not shown), which is capable of adjusting the pressure of the pressure fluid by operation of the handle 44. A pair of ports (not shown) for supply and discharge of the pressure fluid are formed laterally, i.e., on respective sides, of the second body 42. One of the ports is connected to and communicates with the second port 28 of the filter 12, and is supplied with the pressure fluid from the filter 12. The other port, from which the pressure fluid is discharged, is connected to and communicates with a third port 56 of the lubricator 16 (described later).

Further, a pair of engagement projections 46a and a pair of engagement projections 46b are disposed on side surfaces of the second body 42. The pairs of engagement projections 46a, 46b are each mutually opposed to one another on outer edges of end surfaces on which the pair of ports are provided.

In addition, the regulator 14 is equipped with a pressure fluid adjusting mechanism in the interior thereof, the pressure fluid adjusting mechanism being drivable by rotating the handle 44. The regulator 14, after having adjusted to a desired pressure the pressure fluid supplied from the one port, discharges the pressure fluid from the other port and supplies it to the lubricator 16.

Figure 4:
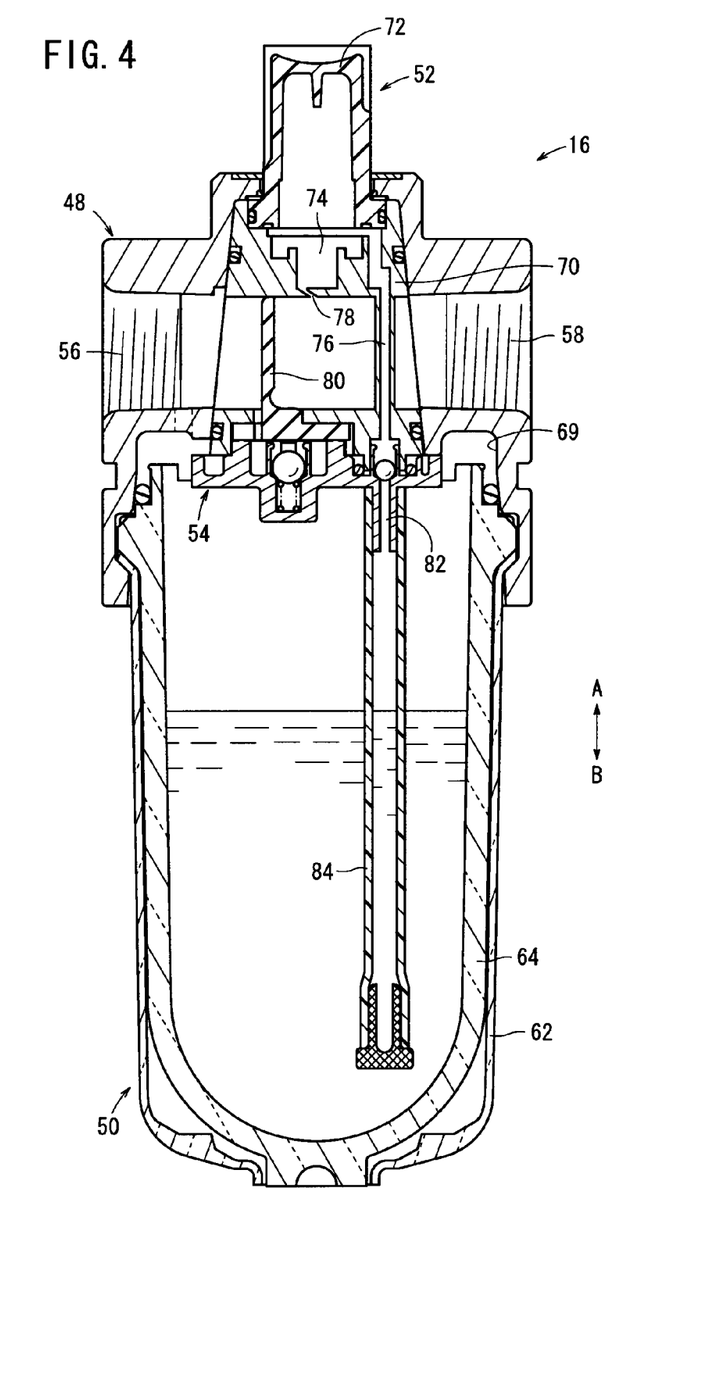
FIG. 4 is an overall cross sectional view of a lubricator, which constitutes part of the fluid pressure unit of FIG. 1.

The lubricator 16 is used with the aim of causing a lubricant oil to be dripped into the pressure fluid, and which by using the flow of the pressure fluid, supplies the lubricant oil to slidable portions in other fluid pressure devices. As shown in FIGS. 1, 2 and 4, the lubricator 16 includes a third body 48, a case unit 50 connected to a lower part of the third body 48, a dripping means 52 that is inserted into the interior of the third body 48, and a holder 54 for fixing the dripping means 52 with respect to the third body 48.

Third and fourth ports 56, 58 for supply and discharge of the pressure fluid are disposed laterally, i.e., on respective sides, of the third body 48. The third port 56 and the fourth port 58 communicate mutually through an unillustrated communication passage. The third port 56 is connected to another port in the regulator 14, which is disposed adjacent thereto, and the fourth port 58 is connected to an unillustrated tube.

Further, a pair of engagement projections 60a and a pair of engagement projections 60b (see FIG. 2) are disposed on side surfaces of the third body 48. The pairs of engagement projections 60a, 60b are each mutually opposed to one another on outer edges of end surfaces on which the third and fourth ports 56, 58 are provided.

The case unit 50 includes an outer case 62 formed as a bottomed cylinder, an inner case 64 inserted through the interior of the outer case 62, and a release button 66 that is displaceable with respect to the outer case 62. The interior of the inner case 64 is filled with lubricating oil through an oil supply plug 68, which is disposed on the third body 48. Additionally, the case unit 50 is installed with respect to an installation hole 69 of the third body 48.

As shown in FIG. 4, the dripping means 52 comprises an inner member 70 that is inserted in the interior of the third body 48, and a drip plug 72 that is provided on an upper portion of the inner member 70. A reservoir 74 through which lubricating oil is supplied from the inner case 64 is formed on the inner member 70. The reservoir 74 communicates with an oil passage 76 that extends downwardly, and lubricating oil is supplied through the oil passage 76. A drip opening 78 opens downwardly in a substantially central portion of the reservoir 74. The oil passage 76 communicates with an oil supply port 82 that is formed in the holder 54.

The holder 54 is installed on a lower portion of the inner member 70 that constitutes the dripping means 52, and retains a portion of a damper 80 interposed between the inner member 70 and the holder 54. The holder 54 comprises the oil supply port 82 which communicates with the oil passage 76. The oil supply port 82 projects downwardly (in the direction of the arrow B), and is arranged in the interior of the inner case 64. An oil guide tube 84 is connected to the oil supply port 82.

In addition, lubricating oil that fills the inner case 64, after passing through the oil guide tube 84 and flowing toward the side of the holder 54, passes through the oil passage 76 and is supplied into the reservoir 74. The lubricating oil passes through the drip opening 78 from the reservoir 74 and is dripped into the communication passage. As a result, a predetermined amount of lubricating oil is mixed with the pressure fluid that flows through the communication passage.

As shown in FIGS. 1, 2 and 5 through 7, the connection apparatus 18a (18b) includes a base member (body) 86, which is formed as a substantially rectangular thin plate, a pair of first and second fastening members 88, 90 disposed on one side and another side of the base member 86, a pair of first and second holders 92, 94 that are retained in the first and second fastening members 88, 90 and which serve to retain the fluid pressure devices, and an attachment member 96, which is connected to the other surface of the base member 86.

Figure 5:
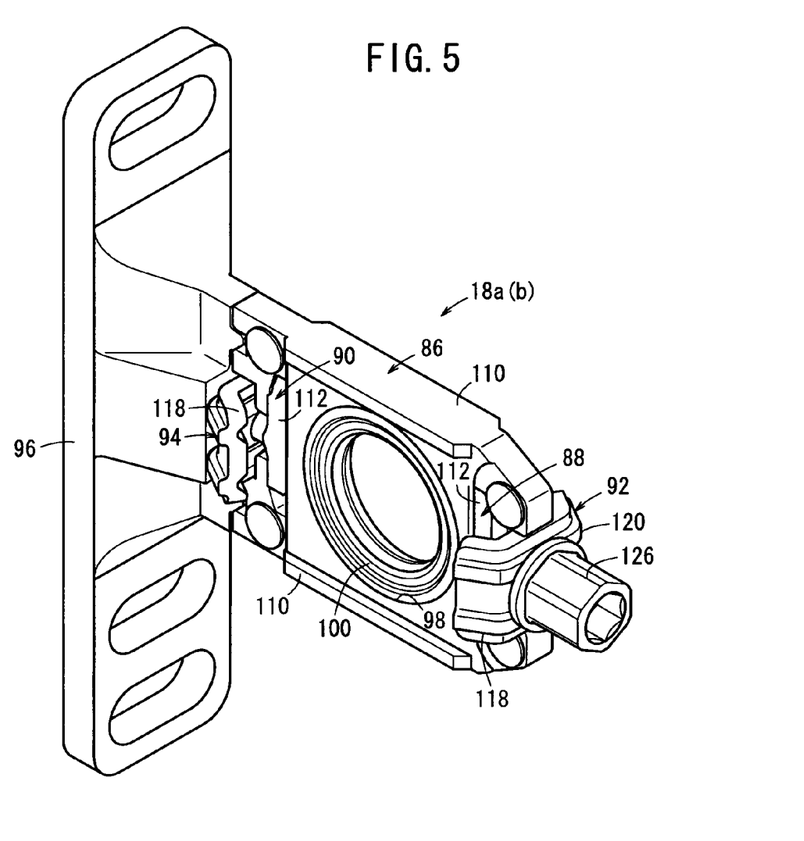
FIG. 5 is an exterior perspective view of the connection apparatus shown in FIG. 1.
Figure 6:
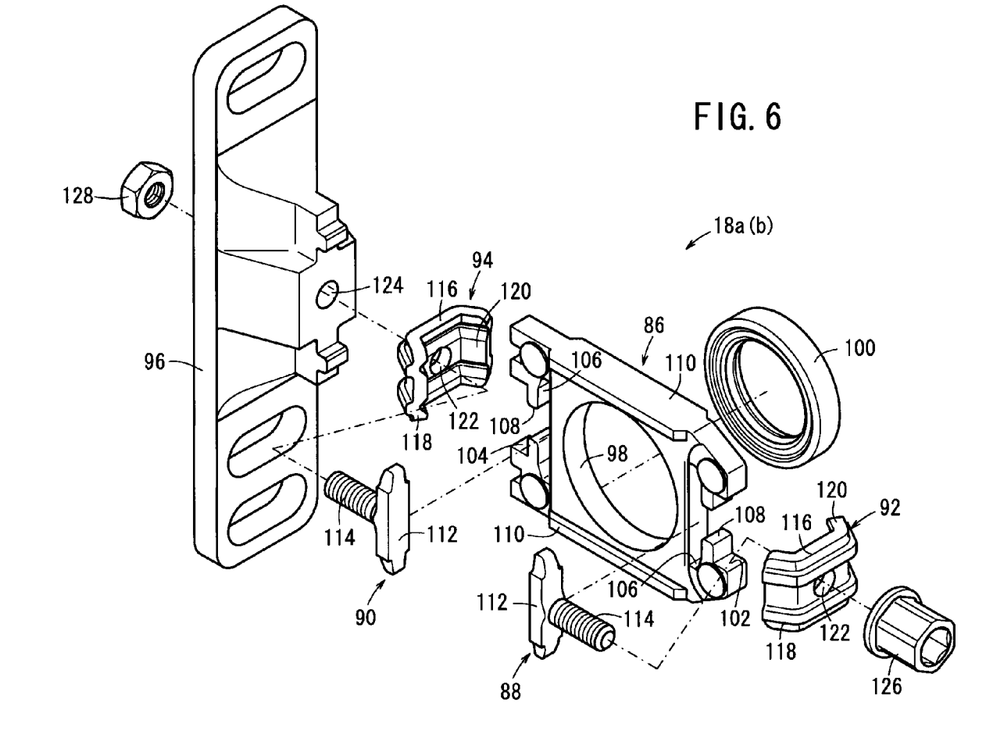
FIG. 6 is an exploded perspective view of the connection apparatus shown in FIG. 5.

The base member 86 is formed with a substantially constant thickness. The base member 86 is formed with a hole 98 substantially in the center thereof, and a sealing ring 100 made from an elastic material is mounted in the hole 98. An outer peripheral surface of the sealing ring 100 is disposed to abut against an inner circumferential surface of the hole 98.

Further, on one side surface and the other side surface of the base member 86, there are formed first and second recesses 102, 104, which are recessed toward the side of the hole 98 and in which first and second holders 92, 94 (to be described later) are installed, grooves 106 that are disposed further toward sides of the hole 98 with respect to the first and second recesses 102, 104, and communication holes 108 that communicate respectively between the grooves 106 and the first and second recesses 102, 104.

The grooves 106 are open spaces that are rectangular in cross section, which are formed in parallel with the first and second recesses 102, 104. The communication holes 108 are formed substantially centrally along the longitudinal direction of the grooves 106.

Furthermore, a pair of flanges 110, which are expanded in width in the thickness direction of the base member 86, are formed respectively on upper and lower surfaces of the base member 86. Stated otherwise, the upper surface and lower surface sides of the base member 86 are widened relative to the base member 86.

Each of the first and second fastening members 88, 90 comprises a main body portion 112 formed with a substantially rectangular shape in cross section, and a threaded portion (shaft portion) 114, which is disposed in the center in the longitudinal direction of the main body portion 112. The threaded portion 114 is formed perpendicularly with respect to the main body portion 112, so as to project a predetermined length with respect to the main body portion 112.

More specifically, the first and second fastening members 88, 90 are formed from the main body portion 112 and the threaded portion 114 so as to be substantially T-shaped in cross section. Further, the threaded portion 114 comprises, for example, a stud bolt, which is engraved with male screw threads on the outer circumferential surface thereof.

The main body portion 112 of the first fastening member 88 is inserted into the groove 106 formed in the one side surface of the base member 86, whereas the threaded portion 114 thereof is inserted into the communication hole 108, such that the end of the threaded portion 114 projects into the first recess 102. On the other hand, the main body portion 112 of the second fastening member 90 is inserted into the groove 106 formed in the other side surface of the base member 86, whereas the threaded portion 114 thereof is inserted into the communication hole 108, such that the end of the threaded portion 114 projects into the second recess 104.

Further, because the first and second fastening members 88, 90 are formed with a thickness dimension that is substantially the same as the thickness dimension of the base member 86, in a state in which the first and second fastening members 88, 90 are installed therein, the first and second fastening members 88, 90 do not project outwardly in the thickness direction from the base member 86.

The first and second holders 92, 94 are made up respectively from a flat portion 116 formed substantially in the center thereof, and first and second retaining members 118, 120, which are inclined at a prescribed angle and formed on both ends of the flat portion 116. In addition, the flat portions 116 are inserted into the first and second recesses 102, 104 of the base member 86, and together therewith, the first and second retaining members 118, 120 are arranged respectively in abutment against sides of the engagement projections 30b, 46a of the filter 12 and the regulator 14.

Further, bolt holes 122, through which the threaded portions 114 of the first and second fastening members 88, 90 are inserted, are formed substantially in the center of the flat portions 116. Additionally, by threading a first nut 126 thereover in a state in which the threaded portion 114 of the first fastening member 88 is inserted through the bolt hole 122, the first holder 92 is retained with respect to the threaded portion 114. On the other hand, by threading a second nut 128 thereover in a state in which the threaded portion 114 of the second fastening member 90 is inserted through the bolt hole 122, the second holder 94 is retained with respect to the threaded portion 114.

The fluid pressure unit 10, to which the connection apparatus according to the embodiment of the present invention is applied, is constructed basically as described above. Next, with reference to FIGS. 5 and 6, an explanation shall be made concerning assembly of the connection apparatus 18a.

First, as with the connection apparatus 18a shown in FIG. 6, the sealing ring 100 is inserted with respect to the hole 98 of the base member 86, and the main body portions 112 of the first and second fastening members 88, 90 are inserted respectively into the grooves 106, whereas the threaded portions 114 thereof are inserted respectively into the communication holes 108 of the base member 86. Consequently, the threaded portions 114 of the first and second fastening members 88, 90 are placed in a state of projecting respectively into the first and second recesses 102, 104 of the base member 86.

Next, the threaded portions 114 are inserted respectively through the bolt holes 122 of the first and second holders 92, 94, and the flat portions 116 of the first and second holders 92, 94 are inserted into the first and second recesses 102, 104. Thereafter, the first nut 126 is threaded with respect to the threaded portion 114 of the first fastening member 88, whereas the threaded portion 114 of the second fastening member 90 is inserted through a through hole 124, which is formed substantially in the center of the attachment member 96, and the second nut 128 is threaded thereover. Owing thereto, the other side surface of the base member 86 is connected with respect to the attachment member 96, and the first holder 92 is retained on the one side surface of the base member 86.

Figure 7:
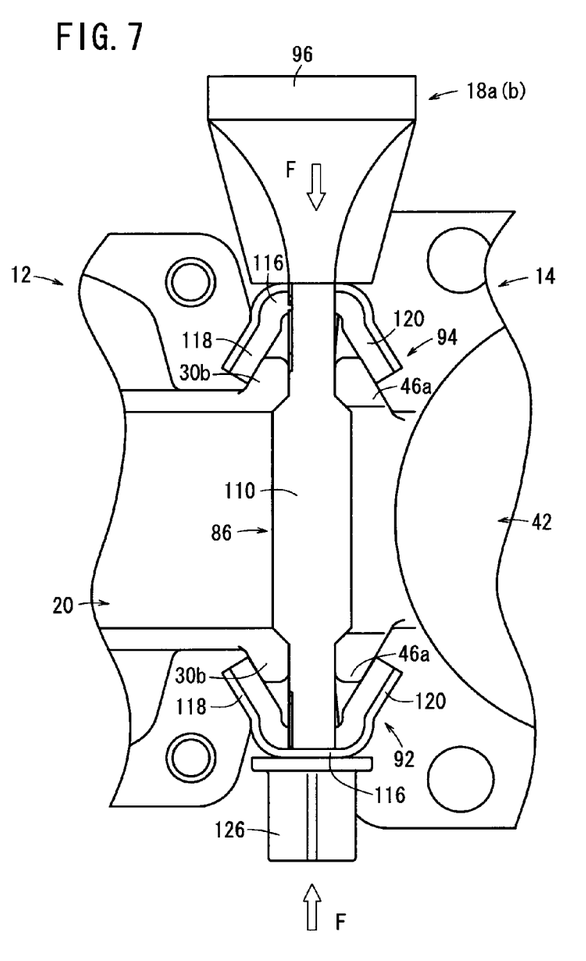
FIG. 7 is an enlarged plan view showing a vicinity of the connection apparatus in the fluid pressure unit of FIG. 1.

Lastly, as shown in FIG. 7, the engagement projections 30b on the second port 28 side on the filter 12 and the engagement projections 46a of the regulator 14 on a port side thereof that is connected to the second port 28 are placed in confronting relation, with the base member 86 being sandwiched between the filter 12 and the regulator 14, whereby the second port 28 of the filter 12 and the port of the regulator 14 are arranged substantially along a straight line.

Additionally, after the first and second retaining members 118, 120 of the first and second holders 92, 94 have been placed in engagement respectively with the engagement projections 30b, 46a, the first and second nuts 126, 128 are screw-rotated. Owing thereto, the first and second nuts 126, 128 are pulled toward the side of the base member 86 along the threaded portions 114, accompanied by the first and second holders 92, 94 being moved toward sides of the base member 86. As a result, the first and second retaining members 118, 120 of the first holder 92 and the first and second retaining members 118, 120 of the second holder 94 are moved in directions to approach one another, whereby the engagement projections 30b of the filter 12 and the engagement projections 46a of the regulator 14 are gripped forcefully and connected together mutually.

In this case, the second port 28 of the filter 12 and the port of the regulator 14 communicate mutually through the hole 98 of the base member 86, and leakage of pressure fluid that flows through the hole 98 to the exterior can be prevented by the sealing ring 100.

Further, in the case that the regulator 14 and the lubricator 16 are connected together as well by the connection apparatus 18b, the aforementioned assembly method is performed substantially in the same manner, and thus detailed explanations thereof have been omitted. Further, the order in which the filter 12, the regulator 14 and the lubricator 16 are assembled is not necessarily limited to the order described above.

As described above, in the present embodiment, the first and second fastening members 88, 90 having the threaded portions 114 are capable of being retained respectively with respect to the base member 86. Owing thereto, compared to a situation in which through holes are formed through which a bolt is inserted with respect to a body (base member), as in the connection apparatus according to the conventional technique, the thickness dimension of the base member 86 can be suppressed. Stated otherwise, in the case that a through hole is formed in the body as in the conventional technique, it is necessary for the thickness of the body to be set such that the body is thick-walled with respect to the outer diameter of the through hole, and compared to the case of the present embodiment, in which threaded portions 114 having male screw threads thereon are disposed with respect to the body (base member), the thickness dimension becomes increased.

More specifically, with the connection apparatus 18a, 18b according to the present embodiment, the base member 86 can be made smaller in scale in the thickness direction, and together therewith, the distance between adjacent fluid pressure devices can be made shorter and the fluid pressure unit 10 can be reduced in scale overall.

Further, because the filter 12, the regulator 14 and the lubricator 16, which define respective fluid pressure devices, can be connected together mutually using thrust forces (refer to the arrows F in FIG. 7) along the axial direction of the threaded portions 114 at the time that the first and second holders 92, 94 are fastened by the first and second nuts 126, 128, the filter 12, the regulator 14 and the lubricator 16 can be strongly interconnected, and together therewith, uniform forces can be applied through the first and second holders 92, 94 with respect to adjacent fluid pressure devices. As a result, the fluid pressure devices are capable of being connected together with good balance.

Furthermore, because the structure can be simplified compared with the connection apparatus for fluid pressure devices according to the conventional technique, the number of parts and assembly steps required therefor can be reduced.

Next, in the fluid pressure unit 10 to which the connection apparatus 18a, 18b assembled in the foregoing manner is applied, a pressure fluid is supplied through a tube from an unillustrated pressure fluid supply source to the first port 26 of the filter 12. The pressure fluid is guided to the interior of the case unit 22 from the first port 26, and by passing through a filter element of the filter unit 24, dust or debris, etc., contained within the pressure fluid is suitably removed. Thereafter, the pressure fluid travels upwardly through the filter unit 24 and is discharged as clean pressure fluid from the second port 28.

Next, the pressure fluid is supplied through the hole 98 of the connection apparatus 18a to one port (not shown) of the regulator 14, and after the pressure fluid has been adjusted to a preset pressure value by the handle 44, the adjusted pressure fluid is supplied through the other port to the lubricator 16, which is connected integrally with the regulator 14 by the connection apparatus 18b.

The adjusted pressure fluid is supplied to the third port 56 of the lubricator 16 and flows through to the side of the fourth port 58. Simultaneously therewith, a portion of the pressure fluid is supplied to the interior of the case unit 50. Consequently, lubricating oil is pressed by the pressure fluid that is supplied into the inner case 64, and the lubricating oil flows through the oil guide tube 84 toward the side of the holder 54 (in the direction of arrow A). Thereafter, the lubricating oil is supplied through the oil passage 76 into the reservoir 74, and is dripped through the drip opening 78 with respect to the pressure fluid. As a result, the pressure fluid, after having been mixed with a predetermined amount of lubricating oil upon passage through the interior of the inner member 70, passes through a tube from the fourth port 58, and is supplied to other fluid pressure devices for which lubrication is required.

The connection apparatus according to the present invention is not limited to the above-described embodiment, and it is a matter of course that various additional or modified structures could be adopted therein without departing from the essence of the invention as set forth in the appended claims.

The invention claimed is:

1. A connection apparatus for fluid pressure devices, which is arranged between one fluid pressure device and another fluid pressure device, by which respective fluid passages of the one fluid pressure device and the other fluid pressure device are mutually communicated, by connecting the fluid pressure devices together integrally, comprising:
   a body having a hole therein by which the fluid passages of the one fluid pressure device and the other fluid pressure device mutually communicate;
   a pair of holders, which are disposed on one side surface and another side surface of the body perpendicular to an axial direction of the hole, and having retaining members that engage with projections disposed respectively on the one fluid pressure device and the other fluid pressure device; and
   a pair of fastening members provided on the one side surface and the other side surface of the body and which are capable of fixing the holders,
   wherein the fastening members include respectively a main body portion that is retained in the body, and a shaft portion projecting with respect to the main body portion, the shaft portions of the fastening members being inserted through the holders, the holders and the fastening members are connected through the shaft portions, and the fastening members are formed with substantially the same width as the body.

2. The connection apparatus according to claim 1, wherein male screw threads are engraved on the shaft portions, and by screw engagement of nuts with respect to the shaft portions, a thrust force is applied with respect to the holders toward sides of the projections.

3. The connection apparatus according to claim 1, wherein the pair of holders and the fastening members are disposed in confronting relation to each other with the body therebetween.

4. The connection apparatus according to claim 1, wherein the fastening members are substantially T-shaped in cross section, the main body portion and the shaft portion thereof being positioned perpendicularly to each other.

5. The connection apparatus according to claim 1, wherein grooves in which the main body portions are inserted are formed in the body.

6. The connection apparatus according to claim 1, wherein the retaining members are inclined at a predetermined angle with respect to a flat portion formed substantially in a center of the holders, such that in a case where the holders are connected to the fastening members, the retaining members are arranged on sides of the body.

7. The connection apparatus according to claim 6, wherein a bolt hole through which the shaft portion is inserted is formed on the flat portion.

* * * * *